United States Patent
Agar et al.

(10) Patent No.: US 6,893,754 B2
(45) Date of Patent: May 17, 2005

(54) FUEL CELL SYSTEM WITH DEVICE FOR WATER RECOVERY AND METHOD OF OPERATING SUCH A SYSTEM

(75) Inventors: David W. Agar, Dortmund (DE); Andreas Docter, Ulm (DE); Martin Gosewinkel, Hamm (DE); Marc Sommer, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 466 days.

(21) Appl. No.: 09/904,572

(22) Filed: Jul. 16, 2001

(65) Prior Publication Data

US 2002/0025459 A1 Feb. 28, 2002

(30) Foreign Application Priority Data

Jul. 14, 2000 (DE) .......................................... 100 34 399

(51) Int. Cl.[7] ................................................. H01M 8/04
(52) U.S. Cl. ............................. 429/13; 429/17; 429/22; 429/13
(58) Field of Search .............................. 429/13, 12, 17, 429/22, 24, 30, 34, 39

(56) References Cited

U.S. PATENT DOCUMENTS

| | | | |
|---|---|---|---|
| 4,283,255 A | 8/1981 | Ramshaw et al. ............. 203/49 |
| 4,400,275 A | 8/1983 | Ramshaw et al. ........ 210/321.1 |
| 6,013,385 A | 1/2000 | DuBose ........................ 429/17 |
| 6,436,562 B1 * | 8/2002 | DuBose ........................ 429/13 |
| 6,436,563 B1 * | 8/2002 | Frank et al. .................. 429/17 |
| 6,492,044 B1 * | 12/2002 | Walsh ........................... 429/13 |

FOREIGN PATENT DOCUMENTS

| | | |
|---|---|---|
| DE | 193260 | 12/1907 |
| DE | 19704888 | 8/1998 |
| DE | 197 26 210 | 12/1998 |
| DE | 19902219 | 6/2000 |
| JP | 63218166 | 9/1988 |
| WO | WO 98/08771 | 3/1998 |
| WO | WO 99/54667 | 10/1999 |
| WO | WO 01/78178 | 10/2001 |

* cited by examiner

Primary Examiner—Bruce F. Bell
Assistant Examiner—Monique Wills
(74) Attorney, Agent, or Firm—Crowell & Moring LLP

(57) ABSTRACT

A fuel cell method and apparatus includes upstream reforming of hydrocarbons and/or alcohols, with water contained in the exhaust air stream of the fuel cell system being recovered. An absorption unit is connected into the exhaust air stream of the fuel cell, and water absorbed therein is released in a desorption unit, preferably by means of heated air to be supplied, and/or by heating the glycol solution. The moist air can subsequently be returned to the fuel cell system or the reforming unit. This makes it possible to recover all of the process water, and to operate the system at low pressure.

15 Claims, 5 Drawing Sheets

FUEL CELL SYSTEM WITH DEVICE FOR WATER RECOVERY AND METHOD OF OPERATING SUCH A SYSTEM

BACKGROUND AND SUMMARY OF THE INVENTION

This application claims the priority of German patent document 100 34 399.6, filed Jul. 14, 2000, the disclosure of which is expressly incorporated by reference herein.

The present invention relates to a fuel cell system in which water contained in the exhaust-air stream is recovered, and to a method of operating such a fuel cell system.

Fuel cell systems are known for example for the operation of an electric motor. A distinction is made between fuel cells to which a fuel is supplied directly and those to which hydrogen obtained by reforming of hydrocarbons, such as gas, diesel, naphtha or alcohols such as methanol is supplied as the fuel. In addition to fuel, a fuel cell also requires oxygen, which is usually supplied by the ambient air. The fuel cell produces water and electrical energy by electrochemical conversion from hydrogen supplied on the anode side and oxygen supplied on the cathode side. Water is often also added as a coolant and/or as a humidifying agent to the streams of substance on the anode side and/or cathode side. The exhaust-air stream of a fuel cell system therefore contains water, including water vapor. Proposals exist for mechanically and/or thermally separating this water out of the exhaust-air stream, in order to recover it for the process. However, components suitable for this purpose are relatively large, or require additional energy, thereby reducing the efficiency of the system.

Apart from air, water is also required for the reforming of hydrocarbons. Known hydrocarbon reformers are schematically represented in FIGS. 4 and 5. FIG. 4 shows the common structure of a hydrocarbon reformer and of a fuel cell system, while FIG. 5 shows a structure modified according to International Patent Document WO 98/08771. Corresponding components are denoted by the same reference numerals in FIGS. 4 and 5.

In principle, as illustrated in FIG. 4, hydrocarbon, air and water are supplied to the reactor 1 via the lines 2, 4 and 3, respectively, from which carbon dioxide and hydrogen can be produced in a chemical reaction. Depending on the mixing ratio, also produced are carbon monoxide components, which are oxidized in a selective oxidation stage 9 to form carbon dioxide. The energy released in this process can be supplied to the reforming process in the form of heat. Carbon monoxide produced can also be converted by a water-gas shift reaction in a high-temperature stage 6 and a low-temperature stage 8, using water to form carbon dioxide and hydrogen.

Furthermore, there are concepts which provide rapid cooling of the reformate gas downstream of the reforming reactor 1 by the addition of water (quenching). Heat exchangers (WÜ) are identified in the figures by the reference numeral 7. Part of the water produced may be separated off before the hydrogen produced in the reforming stage is fed to the fuel cell 11. A fan 10 may be used for cooling the components.

The fuel cell system 11 is subsequently supplied on the anode side with hydrogen and on the cathode side with atmospheric oxygen via the compressor 14. Water and electrical energy are produced from these by electrochemical conversion. Water can be separated off from the exhaust gas of the fuel cell via a heat exchanger 7 and unburned hydrogen can be converted into water via a catalytic burner 12, the heat produced in the process being supplied to a heat exchanger 7. The residual exhaust gas remaining is transported to the outside via an expander 13.

FIG. 5 shows a slightly modified structure of a hydrocarbon reformer. (Apart from the following differences, the process sequence corresponds here to the sequence shown in FIG. 4.) The thermal energy given off by the catalytic burner 12 is used in the heat exchanger 7 (WÜ 5) for the vaporization of a liquid hydrocarbon such as gasoline, which is supplied to the system via the line 2. Water is fed to the system via a heat exchanger 7 (WÜ 2) and enters the high-temperature unit 6 as water vapor for the water-gas shift reaction. Water vapor leaving this unit 6 is supplied together with the vaporized gasoline to the reforming reactor 1 via the line 3. Air passes via the heat exchanger 7 (WÜ 1) via the line 4 to the reforming reactor 1. Furthermore, liquid water is required for cooling of the product in the quenching stage 5.

In the fuel cell systems described, with upstream hydrocarbon reforming, all of the water must be recovered completely within the system, since otherwise the missing water would have to be provided by filling up at a station in the case of a mobile application of the system. In the case of stationary use, there would be increased water consumption of the system, which cannot be tolerated for reasons of environmental protection and cost-effectiveness.

U.S. Pat. No. 6,013,385 discloses water recovery from the cathode exhaust gas of a fuel cell, water recovery by means of a rotating adsorption system or enthalpy wheel being used in addition to the separation of water. A porous material, such as a molecular sieve or zeolite, through which moist, cold exhaust cathode gas flows on one side and hot air, which has to be additionally humidified before entry into the cathode side, flows on the other side, mounted on a shaft is used as the enthalpy wheel. A continuous adsorption and desorption of water is achieved by turning the adsorption material (enthalpy wheel).

Other concepts provide the recovery of the process water by means of condensation downstream of the fuel cell. For this purpose, very low temperatures and/or a high system pressure are required in the condenser. The following difficulties occur in this case. Condensation temperatures below 55° C. can only be realized with difficulty in the case of mobile applications, since the vehicles have to be able to operate even at outside temperatures of over 40° C. and the required vehicle radiators must in this case be of a very sophisticated design (increase in overall size). On the other hand, the required condensation temperature can be increased by increasing the system pressure. However, compressors are necessary to apply the required system pressure, which again uses part of the electrical energy produced in the fuel cell. Also, this part of the energy can only be partially recovered by an expansion engine, so that there is an overall reduction in the system efficiency. Finally, in particular for the startup of the system, the process water must be stored in a tank, creating problems regarding frost resistance.

One object of the present invention is to solve the problems described above in the prior art.

Another object of the invention is to provide a fuel cell system, in particular with upstream reforming for hydrocarbons and/or alcohols, which can be operated at low pressure (atmospheric pressure) and which dispenses as completely as possible with an external supply of water.

This and other objects and advantages are achieved by the fuel cell method and apparatus according to the invention in which the water contained in the moist exhaust air of the fuel cell system is removed from the exhaust air stream by means of absorption and is released again by subsequent desorption. The released water can be returned fully or partially to the process. For this purpose, an absorption unit and a desorption unit are provided according to the invention, the absorption unit being connected into the exhaust-gas line of the fuel cell system, so that the water contained in the exhaust gas can be taken up by the absorbing agent of the absorption unit. A desorption unit, which contains the absorbing agent charged with water, is connected to the fuel cell system for the return of the desorbed water.

Water recovery by means of absorption/desorption according to the invention allows virtually complete recovery of the water used in the process, without requiring an increase in the system pressure. This makes it possible to dispense virtually completely with an external water supply, which is a necessity for use of the fuel cell systems in mobile systems. Furthermore, it is possible to dispense with a compressor, increasing the compactness of the system, and simultaneous reducing costs. Finally, if a suitable absorbing agent is chosen, complete recovery of the absorbed water can be achieved in the following desorption process.

Glycol has proven to be a particularly advantageous absorbing agent, with ethylene glycol, diethylene glycol or triethylene glycol representing suitable absorbing agents in particular. A mixture of one or more of these with water in a specific weight ratio proves to be particularly suitable for physically absorbing water. On account of the great difference between the boiling points of glycol and water, water can be easily separated out of such glycol solutions charged with water. A weight ratio which lies between 0–60% by weight of glycol and 0–40% by weight of water is favorable.

For the desorption, air sucked in from the surroundings, which can be heated if need be, is suitably used. Increasing the solution temperature for the desorption of the water is also possible. However, the glycol solution may also or alternatively be heated.

It is advantageous to supply the recovered water to a reformer for hydrocarbons and/or alcohols, which produces the fuel for the fuel cell. For this purpose, the desorption unit may be supplied with warm, dry air, which leaves the desorption unit after giving off part of its heat and taking up the water contained therein. The warm and moist air is then supplied to the reforming reactor. The reforming reaction may in this case take place with air or water, or with an air/water mixture.

The absorption and desorption units are advantageously combined in such a way that the absorbing agent is circulated, that is to say the absorbing agent leaves the desorber in the regenerated state and re-enters the absorber. After reaching a certain degree of saturation, the absorbing agent is fed back into the desorber.

This process may take place continuously or periodically, in one or more stages, and must be optimized with respect to the requirements during use.

Use of a centrifugal reactor, in which very high mass transfer coefficients can be achieved, proves to be particularly suitable. As a result, the size of the absorption/desorption unit can be reduced. Such centrifugal reactors are described in the patents U.S. Pat. Nos. 4,283,255 and 4,400,275. They can be used generally for mass transfer between two fluids. For this purpose, a liquid phase is introduced into the centrifugal reactor close to the axis of rotation, the centrifugal forces occurring causing the liquid to penetrate a space filled with a permeable packing and rotating about the axis of rotation. A gaseous phase is introduced into the outer space surrounding the rotating space, penetrates the liquid in countercurrent and leaves the reactor by being discharged close to the axis of rotation.

In the present invention, such a centrifugal reactor can be used both for the absorption and for the desorption. In absorption, the absorbing agent (glycol) is supplied to the centrifugal reactor in the liquid phase and, in countercurrent to this, the moist fuel cell exhaust gas is supplied to it in the gaseous phase. In desorption, the absorbing agent charged with water is supplied to the centrifugal reactor as a liquid, and a heated air stream is supplied to it as gas. It is also possible to use a flash chamber, a cyclone or the like.

Other objects, advantages and novel features of the present invention will become apparent from the following detailed description of the invention when considered in conjunction with the accompanying drawings.

DETAILED DESCRIPTION OF THE DRAWINGS

Figure 1:
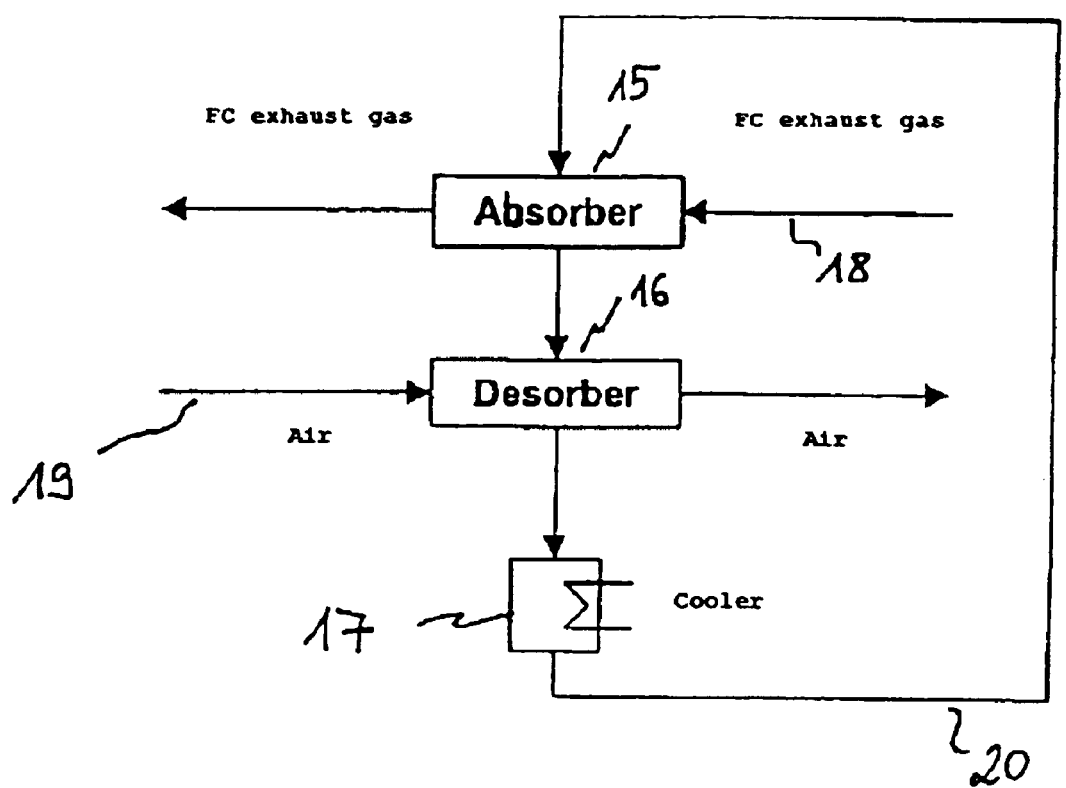
FIG. 1 schematically shows an embodiment of the device according to the invention for water recovery in a fuel cell system.

FIG. 1 shows one possible embodiment of the apparatus according to the invention for the recovery of water in a low-pressure fuel cell system. Serving according to the invention for the water recovery are an absorption unit 15 and a desorption unit 16. In this example, a glycol solution comprising a mixture of diethylene or triethylene glycol and water is used as the absorbing agent, which is circulated via the line 20. The moist exhaust air stream of the fuel cell system (FC exhaust gas) is introduced into the absorption unit 15 via line 18. The water contained therein is physically absorbed by the glycol solution, with the release of absorption energy which is transferred as heat to the exhaust air stream, leaving the absorption unit 15 in a dry and heated state. Glycol solution charged with water is supplied to the desorption unit 16 via the circulating line 20. Air is fed via line 19 into the desorption unit 16 as the desorbing agent, which releases absorbed water and takes it out of the desorption unit 16 while giving off the necessary desorption energy. It is therefore advisable to supply hot and dry air via the line 19. The moist air leaving the desorption unit 16 can then be returned to the fuel cell system or an upstream reforming reactor. The glycol solution heated during the desorption process is passed via line 20 through a cooler 17, to subsequently reenter the absorption unit 15.

Figure 2:
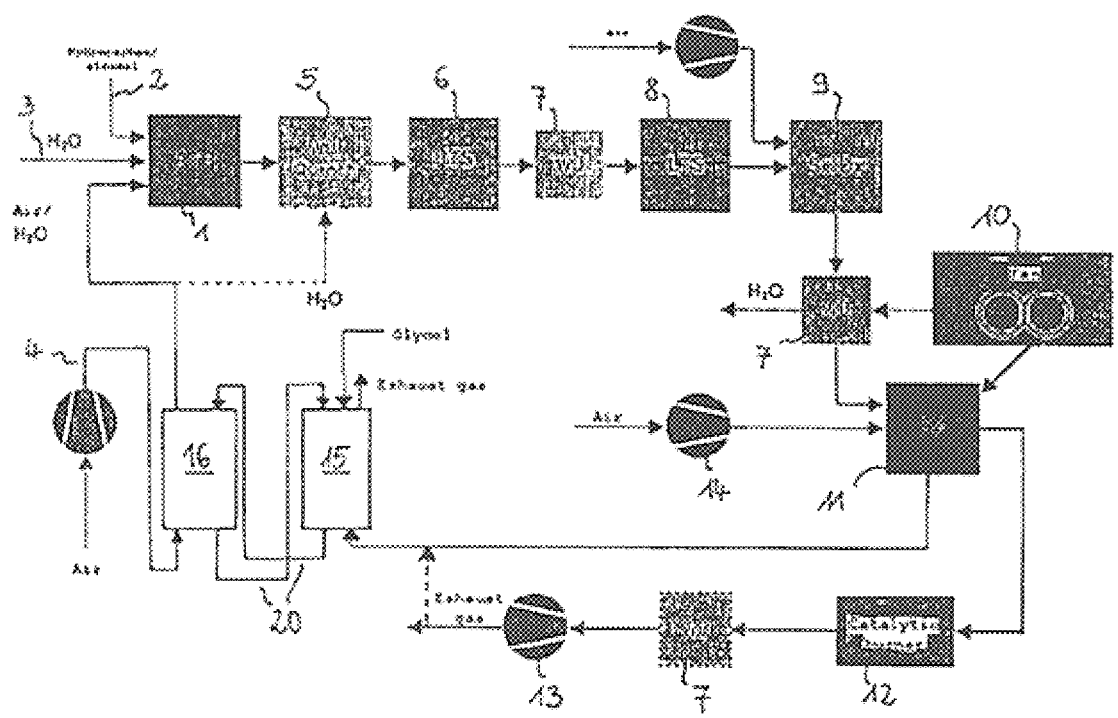
FIG. 2 schematically shows a system for reforming hydrocarbon and/or alcohol with the essential elements of a device according to the invention for water recovery from the exhaust-gas stream of a fuel cell system.
Figure 4:
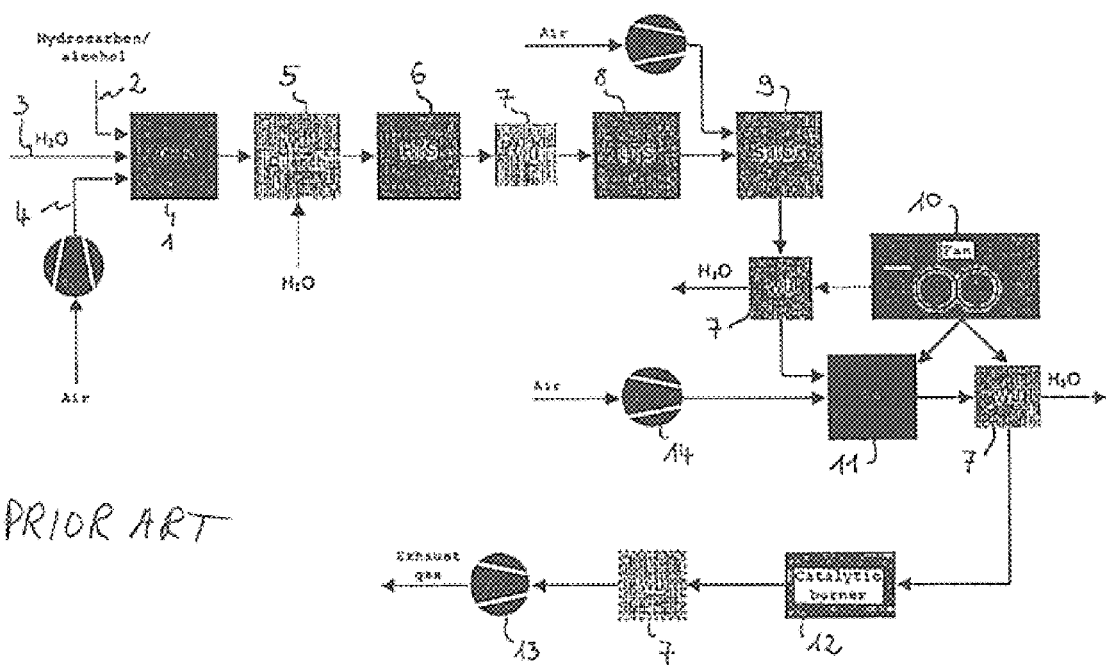
FIG. 4 is a schematic representation of a known hydrocarbon reformer.
Figure 5:
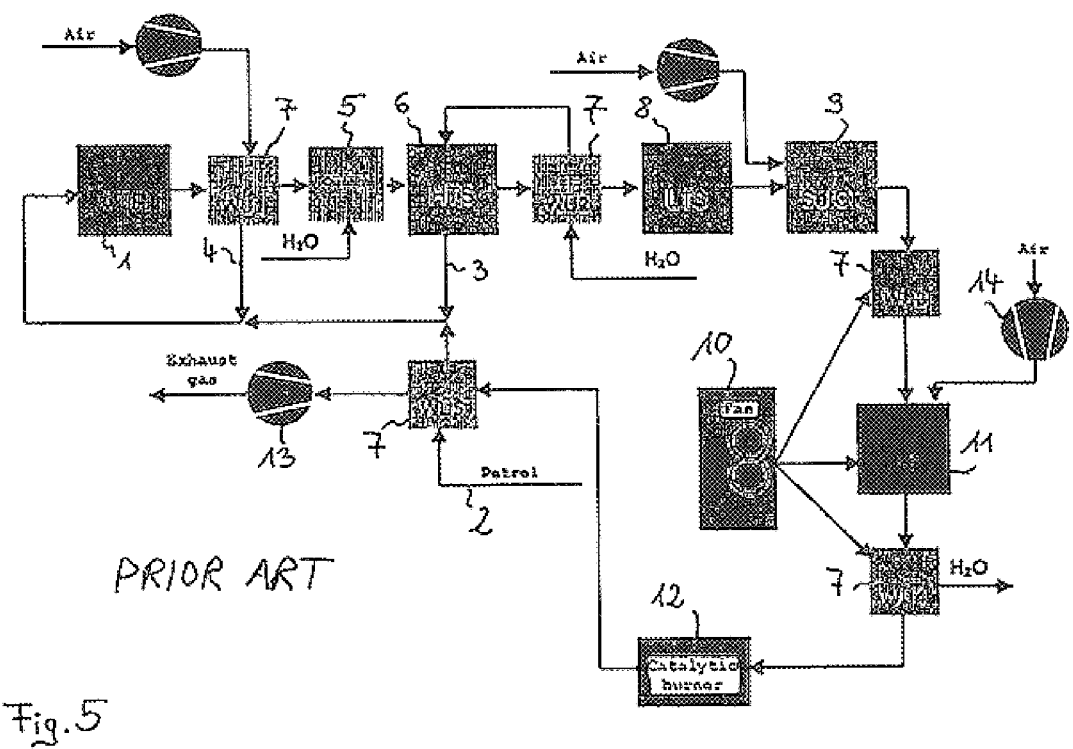
FIG. 5 schematically shows a known modified form of a reformer for hydrocarbons and/or alcohols.

FIG. 2 shows a device according to the invention for water recovery, which is integrated into a fuel cell system with a reforming stage for hydrocarbons and/or alcohols. FIG. 2 is based on FIG. 4, which has already been dealt with, so that reference is made to the explanations provided there in order to avoid unnecessary repetition. Identical components are provided with identical reference numerals.

The exhaust gas leaving the fuel cell system 11 on the anode side and containing, inter alia, residues of unburned hydrogen (about 20% of the original amount of hydrogen) and possibly cooling water, is catalytically converted into water in the catalytic burner 12, it being possible for the heat released to be used for the process and supplied to a heat exchanger 7.

According to the invention, the water-containing exhaust-gas stream on the cathode side is supplied to an absorption unit 15, which is preferably filled with a glycol solution. The glycol solution can be circulated via the line 20, and glycol solution charged with water is fed into the desorption unit 16. The exhaust gas freed of water leaves the absorption unit 15 via an exhaust-gas line.

For the desorption of the glycol solution charged with water, an ambient air stream, which enters the desorption unit 16 via the line 4, is used. To assist the desorption, the air and/or the glycol solution may be heated. The air charged with water vapor is fed to the reforming reactor 1; furthermore, recovered water can be used for the quenching process in the unit 5. It is also possible to supply the absorption unit 15 with the exhaust gas from the catalytic afterburning together with the exhaust gas from the fuel cell.

Figure 3:
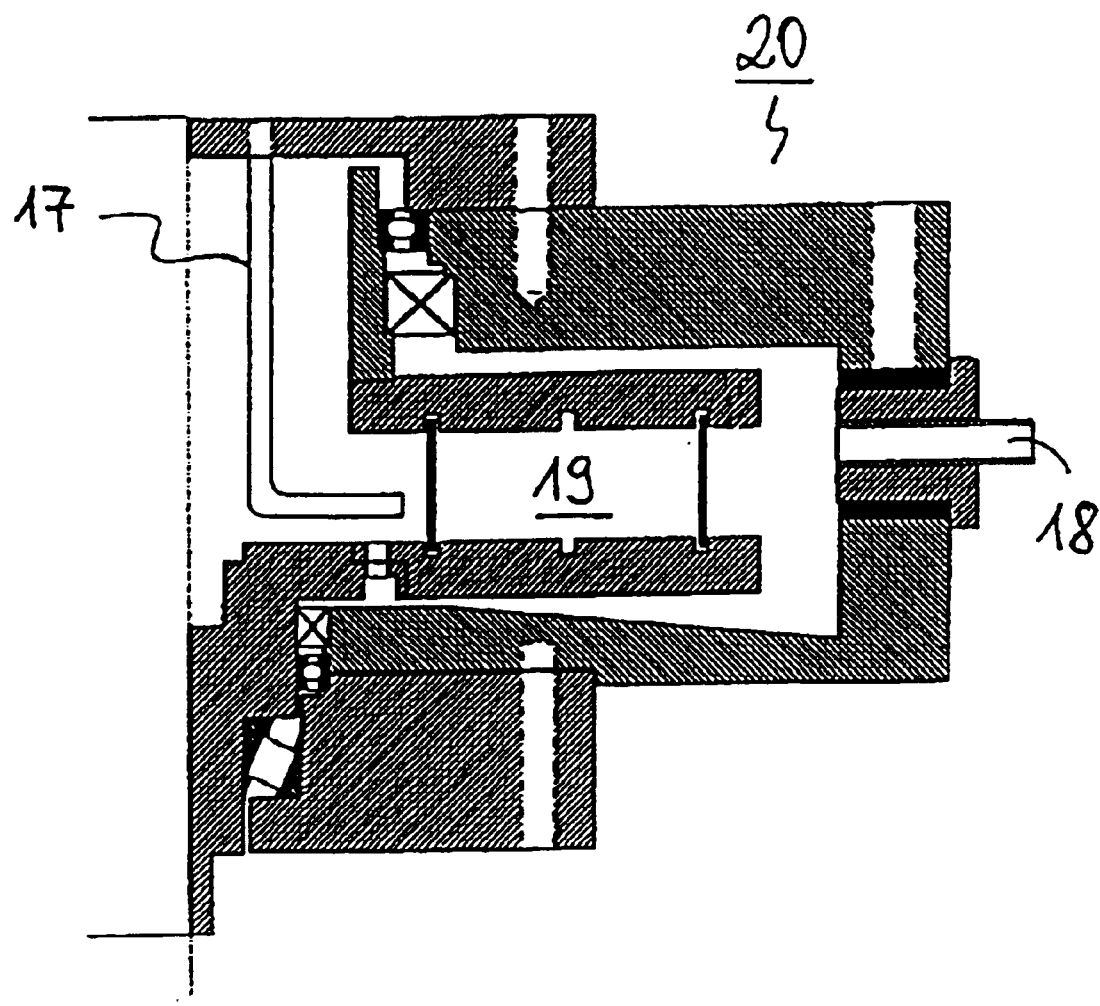
FIG. 3 shows a schematic diagram of a centrifugal reactor, which may serve as an absorption and desorption unit.

FIG. 3 is a simplified depiction of the essential components of a centrifugal reactor which can be used both as the absorption unit 15 and as the desorption unit 16 in the method according to the invention. Liquid is introduced into the interior of the centrifugal reactor 20 via the supply line 17 close to the axis of rotation. On account of the centrifugal forces, the liquid is finely distributed and penetrates the space 19 for various packings, such as for example glass beads. As a result, the residence time is reduced and the contact surface is increased, and consequently the mass transfer resistance is reduced. Gas is jetted into the interior of the reactor via the supply line 18 in countercurrent to the liquid. The gas-liquid countercurrent makes a high mass transfer possible. For the absorption, liquid absorbing agent (such as the glycol solutions mentioned previously) is introduced into the interior of the centrifugal reactor 20 via the line 17.

The centrifugal forces cause the glycol solution to penetrate the packings, preferably comprising glass beads, in a finely distributed form, while gas supplied through the line 18 penetrates the liquid in countercurrent. The intimate mixing of the substances causes water present in the gas stream to be taken up by the liquid (that is, preferably physically absorbed). The absorption may also be chemical. The design of the absorption unit 15 as a centrifugal reactor 20 has the advantage of better mixing of the substances and consequently a higher degree of absorption, with at the same time smaller component dimensions.

If a centrifugal reactor 20 is used as the desorption unit 16, charged absorbing agent is fed in an analogous way via the liquid line 17 into the interior of the reactor 20, while the air sucked in from the surroundings (line 4 in FIG. 2) is introduced into the reactor 20 via the supply line 18. The desorption may also take place by means of a preferably single-stage flash chamber (i.e. single-stage flash evaporator). In any event, process-engineering units corresponding to a single separating stage are suitable.

The fuel cell system according to the invention can be operated at a low system pressure. As a result, no compressor is required to provide the air necessary for the reforming reactor 1; and on the cathode side of the fuel cell 11, no compressors but only fans are required (fan in line 4 and fan 14 in FIG. 2). As a consequence, the parasitic efficiency and consequently the overall system efficiency are improved.

The overall size of the vehicle radiator is reduced, since the heat of condensation otherwise to be dissipated via the latter remains in the system.

Finally, the water is stored in the absorbing agent, so that there are also no problems regarding frost resistance, even when there are low outside temperatures.

The invention makes possible the operation of a fuel cell system with reforming of hydrocarbons and/or alcohols and virtually complete recovery of the process water, so that in the case of mobile use it is possible to dispense to the greatest extent with filling up with water at a station.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of operating a fuel cell system in which water contained in an exhaust gas stream of the fuel cell system is recovered, said method comprising:

removing water contained in the exhaust air stream by means of absorption by an absorbing agent;

releasing the removed water by desorption; and supplying at least part of the released water to the fuel cell system;

wherein said removing of water and releasing of water are both performed during an ongoing operation of said fuel cell system and, wherein glycol is used as the absorbing agent.

2. The method according to claim 1, wherein diethylene glycol is used as the absorbing agent.

3. The method according to claim 1, wherein the desorption takes place by means of air, which is passed through the absorbing agent charged with water.

4. The method according to claim 1, wherein desorbed water is supplied to a reforming stage for at least one of hydrocarbons and alcohols, for producing hydrogen as fuel for the fuel cell system.

5. The method according to claim 1, wherein the absorption and desorption take place in at least one stage.

6. The method according to claim 1, wherein the absorption and desorption are performed continuously in a combined absorption/desorption unit.

7. The method according to claim 1, wherein a centrifugal reactor in which the absorbing agent and one of the exhaust air stream of the fuel cell system and a desorbing agent are conducted in countercurrent with respect to one another, is used for at least one of the absorption and the desorption.

8. The method according to claim 1, wherein the desorbing agent is dry hot air.

9. A fuel cell system having a device for recovery of the water contained in an exhaust air stream of the fuel cell system, wherein the device for recovery of water comprises:

an absorption unit contained in said exhaust gas stream; and a desorption unit contained in an intake air stream of said fuel cell system; wherein, the desorption unit is connected to the fuel cell system for at least partial return of the desorbed water; and, wherein glycol is used as an absorbing agent, said absorption and desorption units are both operable during an ongoing operation of said fuel cell system for removing water contained in the exhaust gas stream, and returning it to said intake gas stream.

10. The fuel cell system according to claim 9, wherein the desorption unit is connected to a reforming stage for at least one of hydrocarbons and alcohols, upstream of the fuel cell system, for returning desorbed water.

11. The fuel cell system according to claim 9, wherein the absorption and desorption units are formed in at least one stage.

12. The fuel cell system according to claim 9, wherein for recovery of water contained in the exhaust gas stream of the fuel cell system, a combined absorption/desorption unit is connected to the fuel cell system in such a way that a continuous or periodic absorption and desorption process is possible by rotation of the combined absorption/desorption unit or by cyclical switching over of the supply and discharge lines to and from this unit.

13. The fuel cell system according to claim 9, wherein:
at least one of the absorption and desorption units is a centrifugal reactor, which has supply lines respectively for an absorbing agent and for the exhaust gas stream of the fuel cell system or for a desorbing agent; and
the streams proceeding in countercurrent through the centrifugal reactor.

14. A fuel cell system, comprising:
a fuel cell stack having an intake air flow path and an exhaust gas flow path;
a water absorption unit situated in said exhaust gas flow path and containing a water absorbent material, for removing water contained in exhaust gas from said fuel cell;
a water desorbing unit disposed in said intake air flow path for transferring water from said water absorbent material to intake air for said fuel cell stack; and
means for migrating said water absorbent material between said water absorption unit and said water desorbing unit and, wherein glycol is used as the water absorbent material.

15. The fuel cell system according to claim 14, wherein said water absorbent material is a fluid which flows in a circuit between said water absorbing unit and said water desorbing unit.

* * * * *